United States Patent
Nakano et al.

(10) Patent No.: US 9,837,882 B2
(45) Date of Patent: Dec. 5, 2017

(54) METHOD FOR INSULATING CONNECTION ENDS OF STATOR WINDING

(71) Applicant: TOYOTA JIDOSHA KABUSHIKI KAISHA, Toyota-shi, Aichi-ken (JP)

(72) Inventors: Yukiko Nakano, Toyota (JP); Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 14/838,868

(22) Filed: Aug. 28, 2015

(65) Prior Publication Data

US 2016/0118869 A1    Apr. 28, 2016

(30) Foreign Application Priority Data

Oct. 28, 2014 (JP) ................. 2014-219584

(51) Int. Cl.
    *H02K 15/00* (2006.01)
    *H02K 15/085* (2006.01)
    *H02K 15/10* (2006.01)

(52) U.S. Cl.
    CPC ........ *H02K 15/105* (2013.01); *H02K 15/0081* (2013.01); *Y10T 29/49009* (2015.01)

(58) Field of Classification Search
    CPC ......... Y10T 29/49009; Y10T 29/49885; Y10T 29/49888; Y10T 29/53143; Y10T 29/53152; H02K 3/32; H02K 15/0056; H02K 15/0068; H02K 15/0075; H02K 15/0081; H02K 15/085; H02K 15/10; H02K 15/105; H02K 15/12

USPC .... 29/596, 458, 466, 732, 734; 310/45, 260; 264/272.19, 272.2

See application file for complete search history.

(56) References Cited

U.S. PATENT DOCUMENTS

| | | | |
|---|---|---|---|
| 4,219,748 A | 8/1980 | Sakaguchi et al. | |
| 6,147,432 A | 11/2000 | Kusase et al. | |
| 6,333,573 B1 | 12/2001 | Nakamura | |
| 2004/0145257 A1 | 7/2004 | Oohashi | |
| 2016/0006314 A1* | 1/2016 | Kaneshige | ............... H02K 3/12 310/71 |

FOREIGN PATENT DOCUMENTS

| | | |
|---|---|---|
| CN | 1518190 A | 8/2004 |
| JP | S51-136103 A | 11/1976 |
| JP | S62-189948 A | 8/1987 |
| JP | 2001-086683 A1 | 3/2001 |
| JP | 2003-111330 A | 4/2003 |
| JP | 2011-097779 A | 5/2011 |

* cited by examiner

*Primary Examiner* — Peter DungBa Vo
*Assistant Examiner* — Joshua D Anderson
(74) *Attorney, Agent, or Firm* — Oliff PLC

(57) ABSTRACT

A method for insulating connection ends of a stator winding includes a resin placing step of placing a resin member formed of a thermosetting resin which is to be melted by heating on connection ends in a coil end portion of a stator winding of a rotary electric machine, a melting step of melting the resin member by heating to cover the connection ends with a melted resin, and a curing step of curing the melted resin after the melting step. Recesses and projections for positioning that correspond to the arrangement locations of the connection ends can be provided on a surface of the resin member.

3 Claims, 4 Drawing Sheets

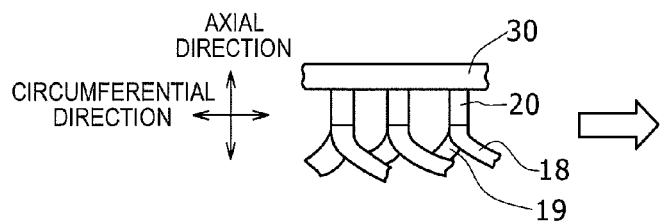 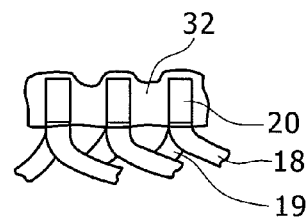
FIG. 4A  FIG. 4B
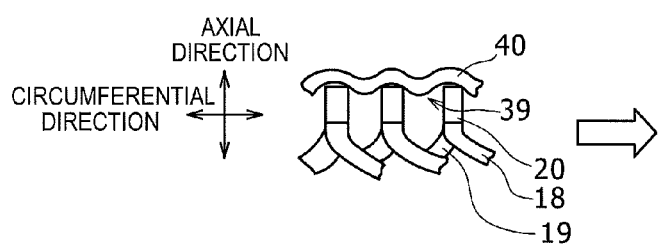 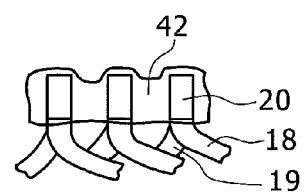
FIG. 5A  FIG. 5B
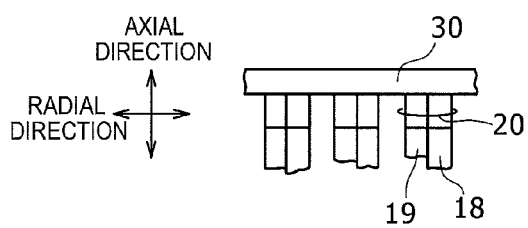 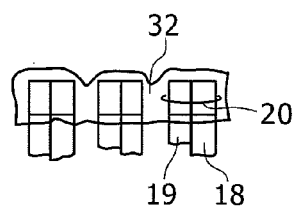
FIG. 6A  FIG. 6B
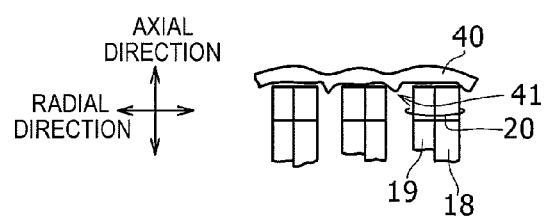 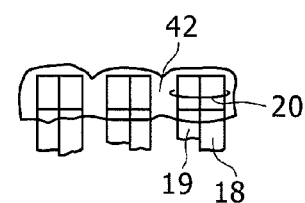
FIG. 7A  FIG. 7B

METHOD FOR INSULATING CONNECTION ENDS OF STATOR WINDING

PRIORITY INFORMATION

This application claims priority to Japanese Patent Application No. 2014-219584, filed on Oct. 28, 2014, the entire disclosure of which is incorporated herein by reference.

TECHNICAL FIELD

The present invention relates to a method for insulating connection ends of a stator winding, and more particularly to a method for insulating connection ends of a stator winding of a rotary electric machine which allows electrical insulation of a plurality of connection ends from each other in a coil end portion of a stator winding of a rotary electric machine.

BACKGROUND

In a stator of a rotary electric machine, a plurality of electric conductors of a winding wound around the stator are connected with each other using joining methods including welding in a coil end portion where the electric conductors project from an end of the stator in the axial direction. In the coil end portion of the stator winding where a plurality of connection ends are formed, it is necessary to secure electrical insulation between one connection end and another connection end, and electrical insulation between the connection ends and other components such as a casing of the rotary electric machine.

JP 2011-097779 A discloses an insulation cap for insulating connection ends of multi-phase windings of a stator of a rotary electric machine. The insulation cap includes a rear portion formed on a folded side of an insulation sheet which is folded into two leaves, and an opening portion which receives a connection end inserted thereto on a side opposite the rear portion. The opening portion is formed by joining both end portions of the folded sheets in the extending direction of the rear portion while leaving the side opposite the rear portion unjoined and open in the folded sheet.

JP 2003-111330 A discloses a method for insulating a plurality of joined portions collectively. With this method, a plurality of joined portions formed by joining tip ends of a plurality of conductor segments inserted into slots of a stator of a rotary electric machine are pressed onto a disc-shape cover member and plastically deformed thereby adhering to the cover member, and thereafter the joined portions are cured by heating.

SUMMARY

Technical Problems

The method for providing insulation caps for individual connection ends in a one-to-one relationship requires a bonding process, a calking process, or other processes for forming the insulation cap for each of the connection ends, which consumes time and labor. While the method for pressing a plurality of connection ends onto a plastic-deformable cover member for bonding requires less time and labor, the pressing force applied to the winding and the connection ends may cause deformation of the stator winding and the connection ends thereof.

It is therefore an advantage of the present invention to provide a method for insulating connection ends of a stator winding, which requires less time and labor and causes no deformation of the stator winding and the like.

Solution to Problem

In accordance with an aspect of the invention, a method for insulating connection ends of a stator winding includes a resin placing step of placing at least one resin member formed of a thermosetting resin which is to be melted by heating on a plurality of connection ends in a coil end portion of a stator winding of a rotary electric machine, a melting step of melting the at least one resin member by heating to cover the plurality of connection ends with a melted resin, and a curing step of curing the melted resin after the melting step.

Preferably, in the method for insulating connection ends of a stator winding of the present invention, the at least one resin member has a size which covers the plurality of connection ends, and the resin placing step includes placing the at least one resin member having the size which covers the plurality of connection ends on the plurality of connection ends.

Preferably, in the method for insulating connection ends of a stator winding of the present invention, the at least one resin member has positioning recesses and projections corresponding to arrangement locations of the plurality of connection ends, and the resin placing step includes placing the at least one resin member such that the recesses are located on tip ends of the plurality of connection ends.

Preferably, in the method for insulating connection ends of a stator winding of the present invention, the at least one resin member includes a single resin member having a size which covers an overall portion of the coil end portion of the stator winding, having an annular shape, and the resin placing step includes placing, on all of the connection ends, the single resin member having the size which covers the overall portion of the annular coil end portion.

Preferably, in the method for insulating connection ends of a stator winding of the present invention, the at least one resin member includes a plurality of resin members having a size which covers a plurality of connection ends arranged along each radial direction of the coil end portion which are separated from each other in a circumferential direction of the coil end portion, and the resin placing step includes placing the plurality of resin members on the plurality of connection ends arranged in respective radial directions.

Preferably, in the method for insulating connection ends of a stator winding of the present invention, the at least one resin member includes a plurality of resin members, and the resin placing step includes placing each of the plurality of resin members on each of the plurality of connection ends in a one-to-one relationship.

Advantageous Effects of Invention

According to the method for insulating connection ends of a stator winding having the above structure, a resin member formed of a thermosetting resin which is to be melted by heating is placed on connection ends and is melted by heating, and the connection ends are covered with the melted resin obtained by heating. Thereafter, the melted resin is cured. It is therefore possible to cover a plurality of connection ends of the stator winding with an insulation resin without deforming the stator winding and the like.

In the method for insulating connection ends of a stator winding, as a resin member having a size which covers a plurality of connection ends is placed on the connection ends, it is possible to perform insulation processing for a plurality of connection ends collectively and at one time, leading to a reduction in time and labor for the insulation processing for a plurality of connection ends of the stator winding.

In the method for insulating connection ends of a stator winding, a resin member having positioning recesses and projections corresponding to the arrangement locations of a plurality of connection ends is placed on the connection ends such that the recesses are located on the tip ends of the respective connection ends. This allows the resin member to be placed with respect to the appropriate locations of the plurality of connection ends, so that a subsequent shift in the location of the resin member with respect to the connection ends can be prevented.

In the method for insulating connection ends of a stator winding, as a resin member, a resin member having a size which covers the overall annular coil end portion of the stator winding of the stator, or a plurality of resin members separated from each other for each radial direction of the coil end portion, may be employed. Also, individual resin members may be employed for the respective connection ends in a one-to-one relationship. It is therefore possible to select an optimal insulation method in accordance with the arrangement of a plurality of connection ends in the coil end portion of the stator winding.

BRIEF DESCRIPTION OF THE DRAWINGS

Preferred embodiments of the present invention will be described in detail based on the following figures, wherein:

FIG. 4A illustrates a procedure for insulating a plurality of connection ends collectively for a portion A of FIG. 3, and shows a resin placing step;

FIG. 4B illustrates a procedure for insulating a plurality of connection ends collectively for a portion A of FIG. 3, and shows a melting step of melting a resin member by heating to cover a plurality of connection ends with the melted resin;

FIG. 5A is a modification example of FIG. 2, illustrating a procedure of positioning a resin member having recesses and projections corresponding to the arrangement of a plurality of connection ends with respect to the locations of a plurality of connection ends for insulating the connection ends collectively, and illustrating a resin placing step;

FIG. 5B is a modification example of FIG. 2, illustrating a procedure of positioning a resin member having recesses and projections corresponding to the arrangement of a plurality of connection ends with respect to the locations of the connection ends for insulating the connection ends collectively, and illustrating a melting step;

FIG. 6A corresponds to FIG. 4A concerning a plurality of connection ends arranged along the radial direction of a stator and shows a resin placing step;

FIG. 6B corresponds to FIG. 4B concerning a plurality of connection ends arranged along the radial direction of a stator and shows a melting step;

FIG. 7A corresponds to FIG. 5A concerning a plurality of connection ends arranged along the radial direction of a stator when a resin member having recesses and projections corresponding to the arrangement of the connection ends is used, and shows a resin placing step;

FIG. 7B corresponds to FIG. 5B concerning a plurality of connection ends arranged along the radial direction of a stator when a resin member having recesses and projections corresponding to the arrangement of the connection ends is used, and shows a melting step;

DESCRIPTION OF EMBODIMENTS

Figure 1:
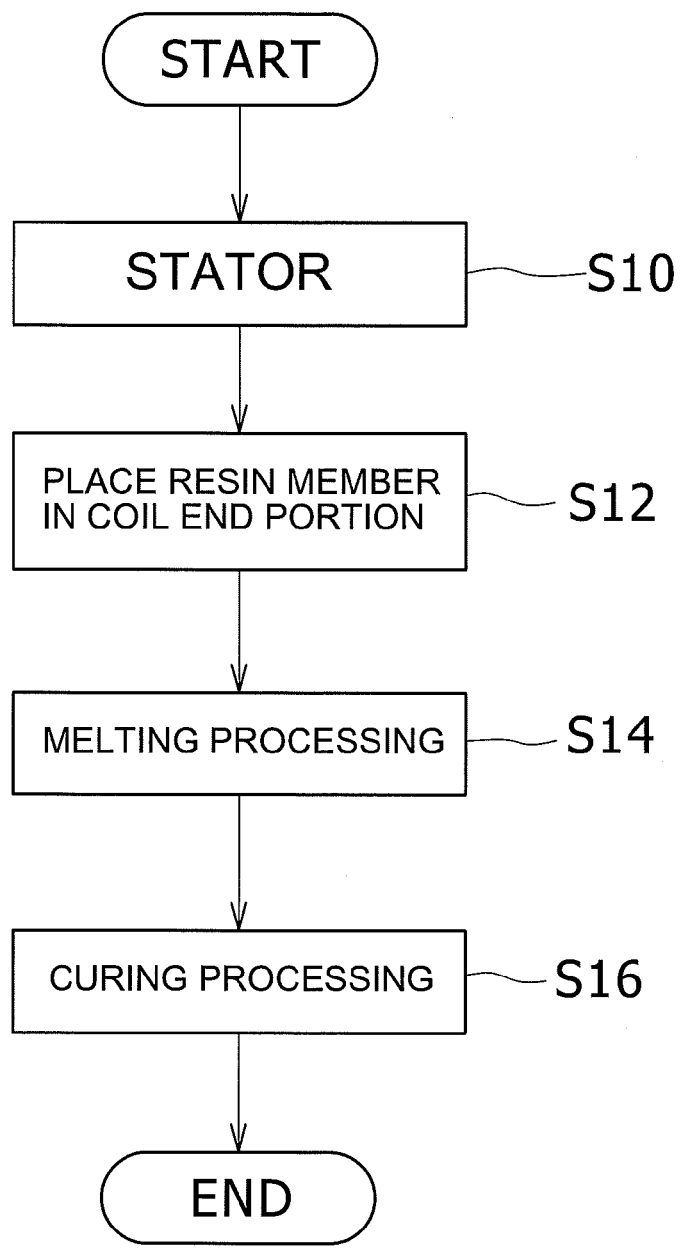
FIG. 1 is a flowchart illustrating procedure of a method for insulating connection ends of a stator winding according to an embodiment of the present invention.

Preferred embodiments of the present invention will be described in detail with reference to the accompanying drawings. While in the following description a three-phase distributed winding formed of a plurality of conductor segments connected with each other will be described as a stator winding, this is only an example, and any windings formed of a plurality of conductors wound around the stator core with the connection ends of the conductors being provided in a coil end portion may be employed. The stator winding may be a wining without using conductor segments. Also, while in the following description a plurality of connection ends of the stator winding are arranged in the coil end portion at equal intervals along the radial direction and at equal intervals along the circumferential direction, such an arrangement is used only for illustrative purpose, and arrangements other than this arrangement may also be employed.

The number, shape, material, or the like of elements which will be described below are employed only for the purpose of illustration, and may be modified as appropriate in accordance with the specification of a rotary electric machine, or a stator or stator winding. In the following description, similar elements are denoted by similar reference numerals in all the drawings and description will not be repeated.

Figure 2:
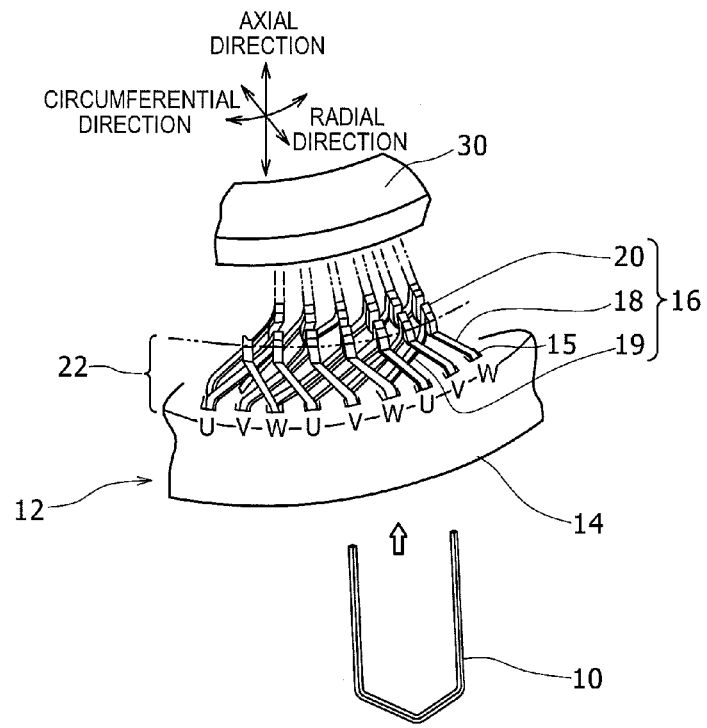
FIG. 2 is a diagram illustrating a step of providing a stator and a resin placing step of placing a resin member on a coil end portion in FIG. 1.

FIG. 1 is a flowchart illustrating a procedure of a method for insulating connection ends of a stator winding, and FIG. 2 and the following drawings illustrate each process step of the procedure in FIG. 1. A stator is a stator of a rotary electric machine, and a stator winding is wound around the stator. A rotary electric machine is a three-phase synchronous type rotary electric machine used for driving a vehicle. A stator winding is composed of a U-phase winding, a V-phase winding, and a W-phase winding. The winding of each phase is formed of a plurality of conductor segments connected with each other in connection end portions and is wound around the stator.

The method for insulating connection ends of a stator winding includes a step of providing a stator of a rotary electric machine (S10), a resin placing step (S12) of placing at least one resin member on a plurality of connection ends in a coil end portion of the stator winding of the stator which is provided, a melting step (S14) of melting the resin member by heating and covering the connection ends with the melted resin, and a curing step (S16) of curing the melted resin by further heating.

FIG. 2 is a diagram illustrating contents of steps S10 and S12 in FIG. 1. In order to show the specific process of step S10, FIG. 2 shows a stator 12 having a stator winding 16 formed thereon, and a conductor segment 10 which is a conductor having a substantially U shape and forms the stator winding 16. FIG. 2 also shows an axial direction, a circumferential direction, a radial direction of the stator 12. The axial direction is a direction in which a central axis of a circle shape of the annular stator 12 extends, the circumferential direction is a direction along the circumference of the annular stator 12, and the radial direction is a direction which is perpendicular to the central axis of the annular stator 12 and extends radially.

The stator 12 includes a stator core 14, and a stator winding 16 wound around the stator core 14. The stator core 14 includes a plurality of teeth extending from a stator yoke having an annular shape toward the inner circumferential side, and slots 15 which are gap portions formed between adjacent teeth. The slot 15 is a U-shape slot having an opening on the inner diameter side and a bottom portion on the outer diameter side, and extending through the axial direction of the stator core 14. The teeth are projection portions around which the stator winding 16 is wound to form magnetic poles. The stator core 14 is formed of a stack of a plurality of annular magnetic thin plates which have been formed in a predetermined shape including the slots 15. As the magnetic thin plate, an electromagnetic steel sheet can be employed. In place of using a stack of magnetic thin plates, magnetic powder may be molded integrally into a predetermined shape.

A plurality of conductor segments 10 are connected with each other to form the stator winding 16. Each conductor segment 10 is formed by forming one conductor wire with an insulation member coated thereon into a substantially U shape. Here, the substantially U shape refers to a shape including two leg portions each extending in a straight line, and a bent portion coupling the two leg portions so as to separate the two leg portions from each other with a predetermined interval provided therebetween. The tip ends of the two leg portions of the conductor segment 10 are inserted into two slots 15 that are separated from each other by a predetermined slot interval in accordance with a winding method of the distributed winding type, among a plurality of slots 15 provided along the circumferential direction on the inner circumferential side of the stator 12.

The slot interval refers to an interval along the circumferential direction, which has been measured based on the interval between adjacent slots 15 as a unit. If the tip end side of one of the two leg portions of the conductor segment 10 is to be inserted into a slot 15 of the U-phase, for example, the tip end portion of the other one of the two leg portions is to be inserted into the next slot 15 of the U-phase. The slot interval at this time corresponds to the predetermined slot interval. FIG. 2 illustrates the slots 15 of U-phase, V-phase, and W-phase, respectively, such that they can be distinguished from each other. While, in the example illustrated in FIG. 2, the predetermined slot interval corresponds to three slots (a three-slot interval), the predetermined slot interval may correspond to six slots (a six-slot interval) and the like, which is an integral multiple of the number of phases, that is, three.

The tip ends of the leg portions of the conductor segment 10 inserted into the slots 15 project toward the end side of the stator 12 in the axial direction so as to form a coil end portion 22. The projecting tip ends of the two leg portions are respectively bent, so that the tip end of one leg portion is made opposite a tip end of one leg portion of another conductor segment 10 which is inserted into the next slot 15 of the same phase on the left side of the slot 15, into which the subject tip end in inserted, along the circumferential direction, and the tip end of the other leg portion is made opposite a tip end of one leg portion of still another conductor segment 10 which is inserted into the next slot 15 for the same phase on the right side of the slot 15, into which the subject tip end in inserted. The opposing tip ends of the two conductor segment 10 are joined with each other by a joining method, such as welding, to thereby form a connection end of the stator winding 16. This is repeated to form the windings for respective phases of the stator winding 16.

In the example illustrated in FIG. 2, the tip end of the conductor segment 18 which is inserted into the slot 15 of the W phase and is bent in the coil end portion 22 is made opposite the tip end of the conductor segment 19 inserted into the next slot 15 of the W phase on the left side which is separated from the slot 15 of the W phase into which the tip end of the conductor segment 18 is inserted by three slots along the circumferential direction and is bent in the coil end portion 22. The two opposing tip ends of the conductor segments 18 and 19 are joined together by a joining method such as welding to thereby form a connection end 20. This process is repeated to thereby form a W-phase winding. A U-phase winding and a V-phase winding are similarly formed. The stator winding 16 is composed of the U-phase winding, the V-phase winding, and the W-phase winding.

As illustrated in FIG. 2, in the coil end portion 22, a plurality of connection ends 20 are arranged at fixed intervals along the circumferential direction, and are also arranged at fixed intervals along the radial direction. The interval in the circumferential direction and the interval in the radial direction are not necessarily identical with each other, but may be set to be identical, as required.

As a conductor wire with insulation coating which is used for such a conductor segment 10, a flat-type wire having a rectangular cross section is used. Use of a flat-type wire enables an increase in the coil space factor within the slot 15. A wire having a circular or elliptical cross section may be used in place of a flat-type wire. A conductor wire with insulation coating is a wire having an outer circumferential surface coated with an insulation film. As the wire, a copper wire, a copper-tin alloy wire, a silvered copper-tin alloy wire, and the like, may be used. While, as the insulation coating, enamel coating of polyamide may be used, polyesterimide, polyimide, polyester, formal, and the like may alternatively be used.

The resin member 30 in FIG. 2 is a resin member which is formed of an annular insulation resin to be placed on the coil end portion 22 in step S12 of FIG. 1. The phrase "to be placed on the coil end portion 22" as used herein refers to placing the resin member so as to cover the coil end portion 22 without applying a pressing force to the coil end portion 22. The resin member 30 is melted to coat the connection ends 20 so as to cover the plurality of connection ends 20 in accordance with the shape of the respective connection ends 20. The resin member 30 is further cured to insulate each connection end 20 of the stator winding 16 with a resin. As such a resin member 30, a sheet formed of a resin member, which is in a solid state at room temperatures and is melted by heating and cured by further heating, can be used. The resin member 30 is formed of a thermosetting resin. As one example resin member, an epoxy resin can be used. In step S12 of FIG. 1, a sheet which is the resin member 30 is only placed on the coil end portion 22 of the stator winding 16 of the stator 12, without applying pressure to the coil end portion 22. As a result, no pressing force or the like is applied to the stator winding 16, the connection ends 20, and the like, thereby preventing these elements from being deformed.

The sheet which serves as the resin member 30 preferably has adhesiveness on a surface thereof, so that the resin member 30 can be temporarily fixed on the plurality of connection ends 20 in the coil end portion 22 with the adhesiveness. In order to provide adhesiveness to the resin member 30, the resin member 30 is placed into a semi-cured state. Alternatively, a separate semi-cured resin or a separate adhesive may be applied to the surface of the resin member 30.

Figure 3:
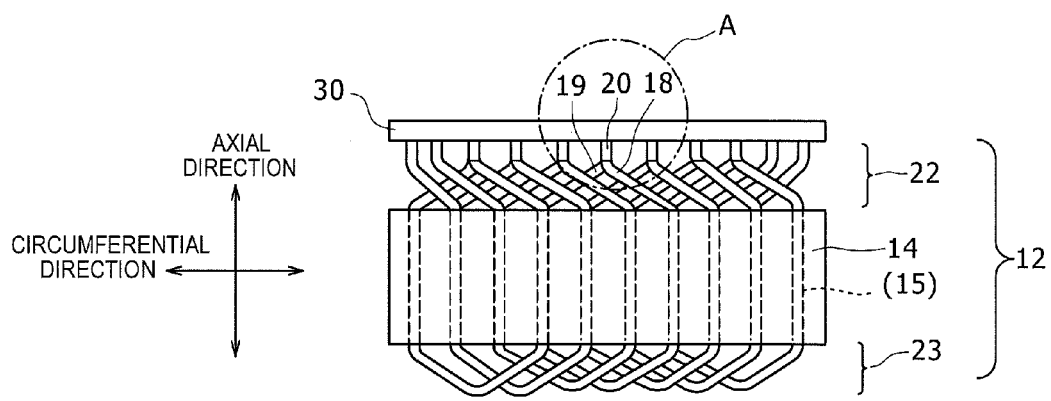
FIG. 3 is a side view of the stator of a rotary electric machine in FIG. 2.

FIG. 3 is a side view illustrating the stator 12 and the resin member 30 in a state where the processing in step S12 in FIG. 2 has been completed. FIG. 3 illustrates a coil end portion 23 in which the bent portions of a plurality of conductor segments 10 having a substantially U shape project toward the other side in the axial direction of the stator 12. The other side in the axial direction refers to the opposite side of the coil end portion 22 with respect to the axial direction of the stator 12, which has been described with reference to FIG. 2.

FIG. 4 shows the processing in steps S12 and S14 in FIG. 1 for a portion A shown in FIG. 3. FIG. 4A shows a state where the resin placing processing in step S12 of FIG. 1 has been completed, and FIG. 4B shows a state where the melting processing in step S14 of FIG. 1 has been completed. The melting processing is performed by heating the resin member 30 to the melting temperature of the resin member 30. The melting temperature depends on the type of an epoxy resin, and is about 100° C. for a biphenyl type epoxy resin. Heating is performed in such a manner that with the resin member 30 being placed on the coil end portion 22 of the stator winding 16 of the stator 12, the stator 12 as a whole is placed in a predetermined heating furnace and the resin member 30 is heated to a predetermined melting temperature. The sheet which serves as the resin member 30 may be locally heated, as necessary.

The melting processing changes the sheet serving as the resin member 30 to a melted resin 32, which covers the connection ends 20, as illustrated in FIG. 4B. The curing processing in step S16 of FIG. 1 is thereafter performed. The curing temperature also depends on the type of epoxy resin and is higher than the melting temperature, and may be approximately from 120° C. to 180° C., for example. The curing processing can be performed using the heating furnace used for the melting processing, in such a manner that the resin member 30 is heated while the heating temperature is raised to the predetermined curing temperature.

A tunnel heating furnace with a conveyer mechanism including a melting temperature region and a curing temperature region along the conveying direction is provided, for example. The stator 12 having the resin member 30 placed on a coil end portion 22 of the stator winding 16 of the stator 12 is placed on the conveyer mechanism and allowed to pass through the melting temperature region and the curing temperature region sequentially in this order, so that the processing in steps S14 and S16 can be performed continuously. Alternatively, a heating furnace for melting and a heating furnace for curing may be separately provided. In some cases, a plurality of connection ends 20 covered with the melted resin 32 may be locally heated to the curing temperature. With these processes, insulation of a plurality of connection ends 20 in the stator winding 16 of the stator 12 can be performed collectively. Upon completion of the processing in step S16, the plurality of connection ends 20 are covered with the cured insulation resin, and the insulation processing of a plurality of connection ends 20 in the stator winding 16 is terminated.

While in the above example a planar sheet serving as the planar resin member 30 is used, a resin member 40 having recesses and projections for positioning may also be used. FIG. 5A and FIG. 5B illustrate a modification example of the example illustrated in FIG. 2 to FIG. 4B. In this modification example, the resin member 40 having recesses and projections 39 corresponding to the arrangement of the connection ends 20 is used to position the resin member 40 such that the recesses and projections 39 thereof correspond to the arrangement of a plurality of connection ends 20, thereby insulating the connection ends 20 collectively without shifting the resin member 30 for the arrangement of the connection ends 20.

FIG. 5A illustrates a resin placing step, in which with the recesses and projections 39 of the resin member 40 positioned so as to correspond to the arrangement of a plurality of connection ends 20, the resin member 40 is simply placed on the connection ends 20 without applying pressure on the connection ends 20. FIG. 5B illustrates a melting step, in which the plurality of connection ends 20 are covered with a melted resin 42. Thereafter, the curing processing illustrated in step S16 of FIG. 1 is performed.

FIGS. 4A, 4B, 5A, and 5B are drawings seen along the circumferential direction of the stator 12. FIGS. 6A, 6B, 7A, and 7B are drawings seen along the radial direction of the stator 12. Specifically, FIGS. 6A and 6B correspond to FIGS. 4A and 4B, respectively, and FIGS. 7A and 7B correspond to FIGS. 5A and 5B, respectively. The drawings seen along the circumferential direction and the drawings seen along the radial direction differ from each other in that two tip ends of the conductor segments 18 and 19 corresponding to a connection end 20 are shown overlapping each other in FIGS. 4A, 4B, 5A, and 5B which are seen along the circumferential direction, whereas the two tip ends are shown side by side in FIGS. 6A, 6B, 7A, and 7B which are seen along the radial direction. As the specific contents of the processing in steps S12, S14, and S16 have been already described, description of these steps will not be repeated.

While a plurality of connection ends 20 are arranged at fixed intervals along the circumferential direction and are also arranged at fixed intervals along the radial direction, the interval in the circumferential direction and the interval in the radial direction are not necessarily identical with each other. Accordingly, the interval of the recesses and projections 41 along the radial direction illustrated in FIG. 7A differs from the interval of the recesses and projections 39 along the circumferential direction illustrated in FIG. 5A. Even in this case, however, a plurality of connection ends 20 are covered with the melted resin 42 as illustrated in FIG. 7B, which is the same as the example illustrated in FIG. 5B.

Figure 8A:
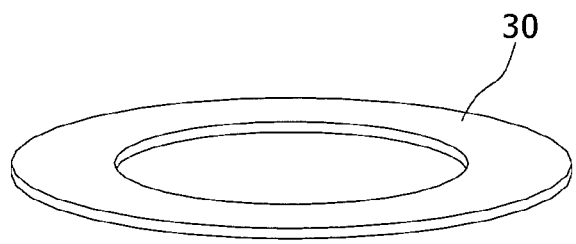
FIG. 8A illustrates an example resin member, which is an annular resin member, used in a method for insulating connection ends of a stator winding according to an embodiment of the present invention.
Figure 8B:
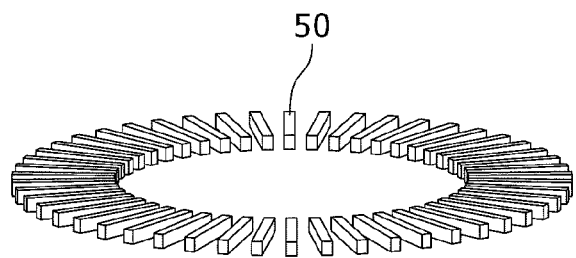
FIG. 8B illustrates an example resin member used in a method for insulating connection ends of a stator winding according to an embodiment of the present invention, and illustrates rectangular resin members separated from each other for each radial direction.
Figure 8C:
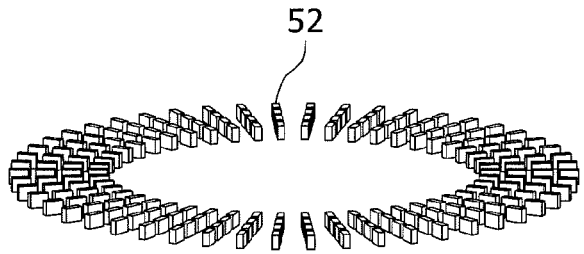
FIG. 8C illustrates an example resin member used in a method for insulating connection ends of a stator winding according to an embodiment of the present invention, and illustrates small rectangular resin members separated from each other for each of the individual connection ends.

FIGS. 8A, 8B, and 8C illustrate example shapes of the resin member which is used. FIG. 8A illustrates the annular resin member 30 used in FIG. 2 to FIG. 7B. FIG. 8B illustrates rectangular resin members 50 separated from each other for each radial direction. Each of the rectangular resin members 50 is placed on a plurality of connection ends 20 arranged in the same radial direction in FIG. 2. The resin members 50 illustrated in FIG. 8B, when compared with the resin member 30 illustrated in FIG. 8A, allows a reduction in the cost of materials of the resin member for the entire stator 12. FIG. 8C illustrates small rectangular resin members which are separated from each other corresponding to each of a plurality of connection ends 20. The resin members 52 illustrated in FIG. 8C, when compared with the resin members 50 illustrated in FIG. 8B, allows a further reduction in the cost of materials of the resin members for the entire stator 12. While an example in which a large number of connection ends are formed using conductor segments has been described above, in a case where the number of connection ends is not very large, as described in JP 2011-97779 A, for example, it is effective to place the resin member 52 on each connection end 20 in a one-to-one correspondence.

When a plurality of separate resin members as illustrated in FIGS. 8B and 8C are used, while the cost for the resin members can be reduced for the entire stator 12, the number of processes may be increased in order to place a plurality of resin members on the predetermined connection ends 20 of the stator winding 16. In order to suppress the increase in the number of processes, it is possible to connect the rectangular resin members 50 illustrated in FIG. 8B with each other. For example, it is possible to connect these rectangular resin members 50 illustrated in FIG. 8B with each other using a ring portion having a small ring width on the outer circumferential side of the stator 12. Further, concerning the resin members 52 illustrated in FIG. 8C, it is possible to connect the small rectangular resin members arranged on each circle having the same diameter with each other along the circumferential direction to thereby form a plurality of annular members having small widths. When five connection ends 20 are arranged in the radial direction, for example, five annular resin members having small widths can be formed.

As an intermediate form between the examples illustrated in FIGS. 8A and 8B, a plurality of rectangular resin members 50 can be connected together to form a resin member having a sector shape. The recesses and projections 39 and 41 which have been described in FIGS. 5A, 5B, 7A, and 7B can be similarly formed on these resin members.

The above structures can eliminate the need to form a sheet serving as the resin member in a specific cap shape, and can also eliminate the need to provide an adhesive to form such a cap shape. As mechanical fixing such as calking is also not necessary, mechanical deformation or damage would not be caused in the stator winding 16 and the connection ends 20. While in a resin drop method in which a resin in a liquid state is dropped to cover the connection ends 20 it is difficult to drop the resin on an appropriate portion of the connection end 20 and the liquid resin adheres to a portion other than connection ends 20, which requires an additional process to remove such a resin and an increased amount of consumed resin, the structures described above allow the resin to reliably cover only the intended portion of the connection ends 20 by simply placing a sheet serving as the resin member on the connection end 20 and melting and curing the resin member. This enables the insulation processing of the connection ends of a stator with a reduced cost for the resin member and a reduced number of processes.

While the preferred embodiments of the present invention have been described using specific terms, such description is for illustrative purposes only, and it is to be understood that changes and variations may be made without departing from the spirit or scope of the appended claims.

REFERENCE SIGN LIST

FIGS. 10, 18, 19 conductor segment, 12 stator, 14 stator core, 15 slot, 16 stator winding, 20 connection end, 22, 23 coil end portion, 30, 40, 50, 52 resin member (sheet), 32, 42 melted resin, 39, 41 recesses and projections.

The invention claimed is:

1. A method for insulating connection ends of a stator winding, comprising:
   a resin placing step of placing at least one resin member formed of a thermosetting resin in a solid state without applying a pressing force onto a plurality of connection ends in a coil end portion of a stator winding of a rotary electric machine;
   a melting step of melting the at least one resin member placed on the plurality of connection ends by heating to cover the plurality of connection ends with a melted resin; and
   a curing step of curing the melted resin after the melting step, wherein
   the at least one resin member has a size which covers the plurality of connection ends,
   the at least one resin member has positioning recesses and projections corresponding to arrangement locations of the plurality of connection ends configured to prevent the at least one resin member from shifting after being placed on the plurality of connection ends, and
   the resin placing step comprises placing the at least one resin member on the plurality of connection ends such that the recesses are located on tip ends of the plurality of connection ends.

2. The method according to claim 1, wherein
   the at least one resin member comprises a single resin member,
   the single resin member has a size which covers an overall portion of the coil end portion of the stator winding, the coil end portion having an annular shape, and
   the resin placing step comprises placing the single resin member having the size which covers the overall portion of the annular coil end portion on all of the connection ends.

3. The method according to claim 1, wherein the at least one resin member comprises a plurality of resin members, the plurality of resin members having a size which covers the plurality of connection ends arranged along each radial direction of the coil end portion, the plurality of resin members being separated from each other in a circumferential direction of the coil end portion, and the resin placing step comprises placing the plurality of resin members on the plurality of connection ends arranged in respective radial directions.

* * * * *